April 4, 1967 H. A. STAFFORD 3,312,127
TWIST DRILL
Filed Feb. 16, 1965

HENRY A. STAFFORD
INVENTOR.

BY Mason & Graham

ATTORNEYS

United States Patent Office 3,312,127
Patented Apr. 4, 1967

3,312,127
TWIST DRILL
Henry A. Stafford, Santa Maria, Calif., assignor to Semco Twist Drill and Tool Co., Santa Maria, Calif., a corporation of California
Filed Feb. 16, 1965, Ser. No. 432,999
3 Claims. (Cl. 77—71)

My invention has to do with improvements in twist drills.

Conventionally such a drill has its threaded shank portion threaded into the axial bore of one of the driving gears of the angle head of a drilling tool. It has long been a serious shortcoming with such drills that, in use, the threaded shank portion of the drill will break off at the point at which it emerges from the gear, rendering it difficult or impossible to remove the broken off shank, and often requiring the dismantling of the drilling device to substitute a new driving gear. That is, so far as I am aware, none of the twist drills which are known have incorporated in the drill any means for easily removing such a broken-off shank portion from the driving gear.

It is a principal object of my present invention to provide a drill bit having a threaded shank portion adapted to be threaded into the threaded bore of a driving gear, and which incorporates means in the inner end of the shank portion of the drill for using an ordinary screwdriver to remove the shank from the driving gear in the event the shank breaks off in the gear.

Other objects and corresponding advantages will appear from the following description of a presently preferred embodiment of my invention, for which purpose I shall refer to the accompanying drawing wherein.

Figure 1:
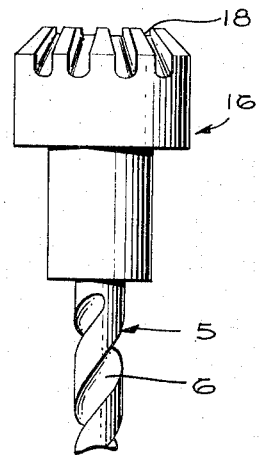
FIG. 1 is a side elevational view showing my improved drill with its threaded shank portion threaded into the axial bore of a driving gear.
Figure 2:
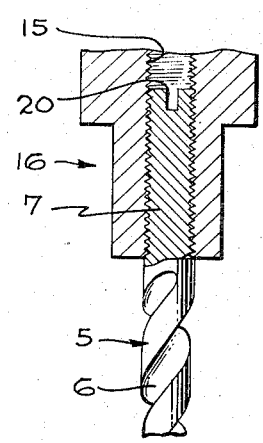
FIG. 2 is a view like FIG. 1 except that it shows portions in section.
Figure 3:
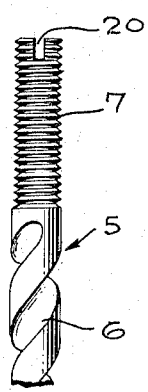
FIG. 3 is a side elevational view of my improved drill before it is mounted in the driving gear of the drilling tool.

Referring now to the drawings, the numeral 5 generally denotes my improved twist drill. The drill has a cutting portion 6 and the threaded shank portion 7.

The shank portion 7 is customarily threaded into the internally threaded axial bore 15 of a conventional driving gear 16, whose top end has gear teeth 18 to be engaged by the teeth of another gear, not shown. The drill and driving gear, as shown, are of conventional construction except for my improvements in the drill shank which will be hereinafter explained.

Figure 4:
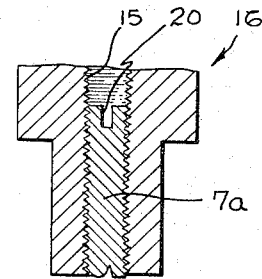
FIG. 4 shows, in section, the driving gear having the shank portion of a drill broken off therein.

In use, the shank portion 7 of a drill will often break off at the driving gear, leaving only the broken-off shank portion 7a (FIG. 4) remaining threaded into the bore of the driving gear. Heretofore it has been difficult or impossible to remove the broken-off shank portion preparatory to installing a new drill.

I have overcome this shortcoming of prior drills by providing, in the inner end of the drill shank, a driving recess or slot 20. While I have shown this recess 20 as a transverse tool-receiving slot for an ordinary screwdriver, it will be understood that the recess may be formed to receive any other type of driver, so long as it presents some circumferential abutment to be engaged by the driver.

Thus, inasmuch as the driving gear conventionally has an axial bore opening through both its ends, the user may quickly and easily remove a broken-off shank by inserting a suitable driving tool through the upper end of the bore into engagement with the driving recess, and then rotate the broken-off shank until it is fully unscrewed from the bore.

I claim:

1. In a drilling device having a drill driving gear presenting a threaded axial bore opening through both of its ends and a twist drill having a threaded shank portion threaded into said bore from its outer end, said threaded shank portion being characterized by having a recess in its inner end presenting an abutment surface to be engaged by a screwdriver, whereby to facilitate removal of said shank portion from said bore in the event it should become broken off in said bore.

2. The device of claim 1 wherein said recess in the inner end of the shank portion of said drill is in the form of a transverse slot.

3. The device of claim 1 wherein said recess in the inner end of the shank portion of said drill presents a circumferentially facing abutment surface to be engaged by a driving tool.

No references cited.

FRANCIS S. HUSAR, *Primary Examiner.*